Figure 4:
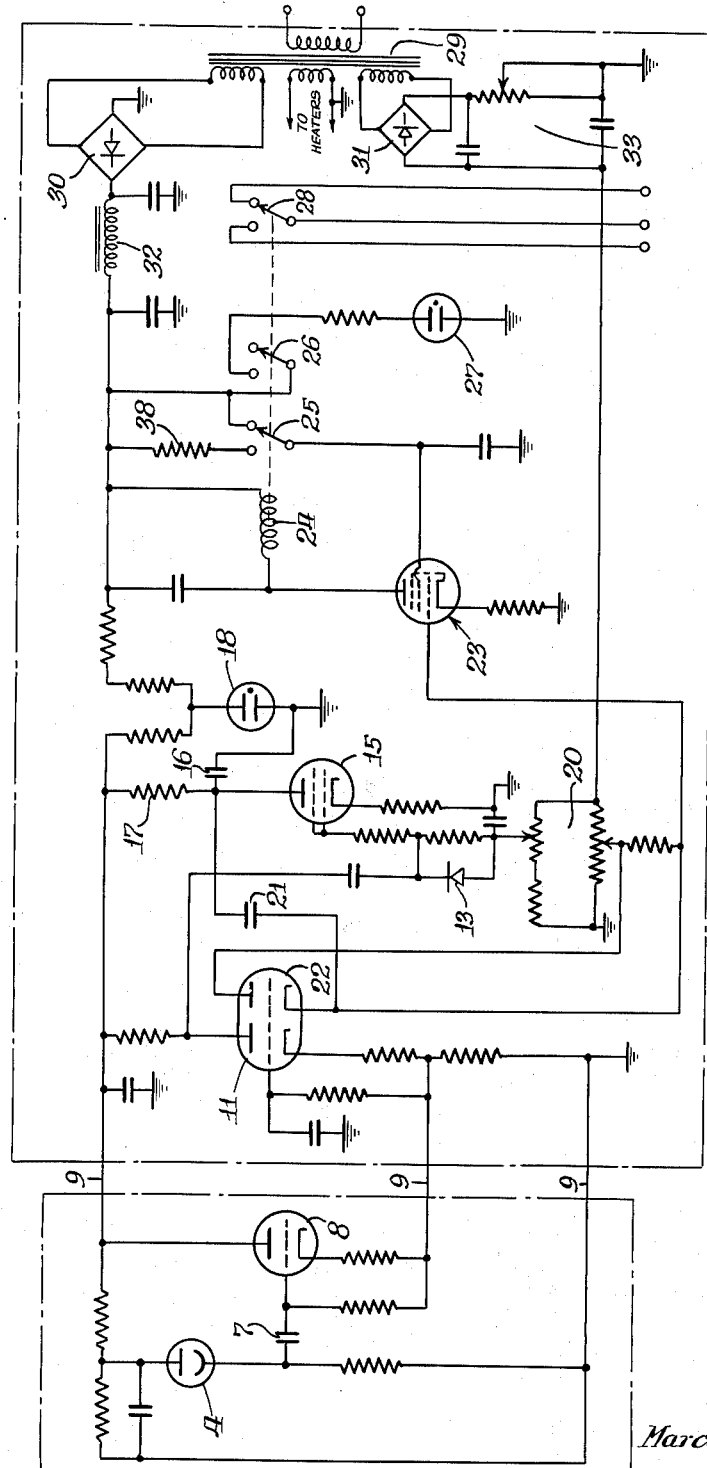

Aug. 31, 1965     M. C. PFISTER     3,204,108
SENSING HEAD DEVICE FOR THE SENSING OF ROLLED STOCK
Filed Oct. 5, 1961                2 Sheets-Sheet 1
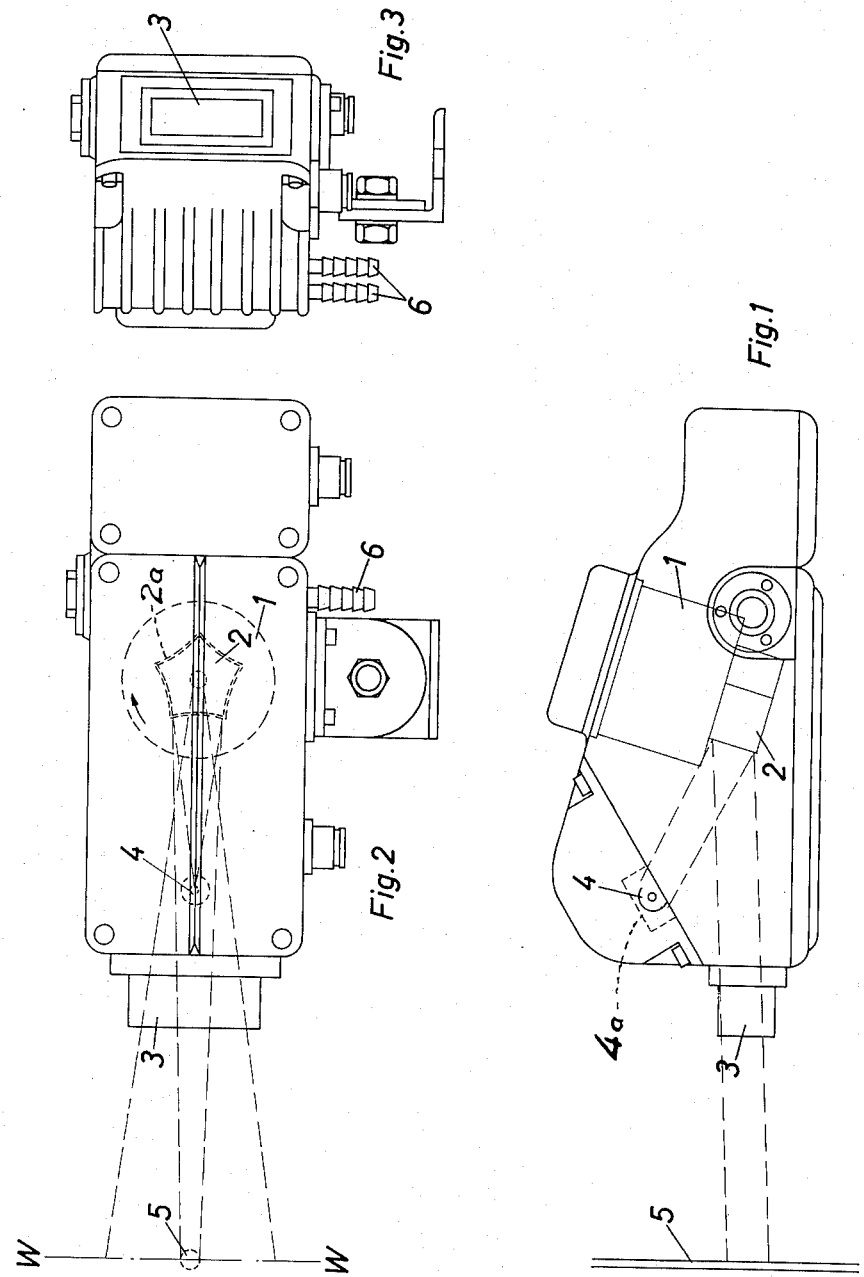
INVENTOR.
Marcel Charles Pfister Inventor
Marcel Charles Pfister
By
Darbo, Robertson &
Vandenburgh Attys.

United States Patent Office 3,204,108
Patented Aug. 31, 1965

3,204,108
SENSING HEAD DEVICE FOR THE SENSING
OF ROLLED STOCK
Marcel Charles Pfister, 2 Rue de Pres, Eckbolsheim,
near Strasbourg, France
Filed Oct. 5, 1961, Ser. No. 143,249
4 Claims. (Cl. 250—219)

This invention relates to a sensing head for the sensing of rolled stock, which responds to the radiation emitted by the rolled stock and produces a signal when it is passed by the front or the further end of the rolled stock. Such a sensing head is used e.g. in electronically controlled rolling mills to actuate a side way or a cutter or to release similar switching operations.

A sensing head of this type using a lead sulphide cell is well known. This is a radiation detector responding to thermal radiation and includes a differentiating circuit connected at the output thereof. The differentiating circuit is responsive to only sudden changes of the impinging radiation, e.g. when the rolled stock enters the "visual field" of the sensing unit, manifested as control impulses, whereas changes in the ambient temperature and of the temperature of the cell itself have no effect.

In practice, it has been found that false switching impulses can be caused with such a sensing head due to fluttering movements of the rolled stock by which the rolled stock is moved out of the visual field of the sensing head. It can also happen that the rolled stock does not have a uniform temperature. This has for instance been found with wires of 5, 6 and 8 millimeters diameter. Also the radiation characteristics of the rolled stock can suddenly change. For instance, the rolled stock may have black spots due to thermal shock or a water spot may occur on the strap between two rolling stands. With a sensing head of the known type described above, such changes in emission can also produce switching impulses and may then cause false switching operations.

This invention has for its object to avoid these disadvantages of the prior art device. According to the invention, the sensing head is devised for this purpose in such a manner that the radiation dectector through a movable mirror scans a range perpendicularly to the direction of movement of the rolled stock (which range is wider than the rolled stock) and that the output signal of the radiation detector is applied to a circuit that responds as soon as the radiation detector provides impulses. Thus, in fact, the amplitudes of the impulses change if the emission of the rolled stock changes. The impulse amplitudes also depend upon the distance of the sensing head from the rolled stock. This is, however, insignificant, since the said circuit is so designed that it discriminates only, whether the radiation detector provides impulses or not. Advantageously, the output impulses of the radiation detector are applied through an impulse transducer, for instance, in that the impulses control a saw tooth generator. The radiation detector also here may be a photoconducting cell, for instance a lead sulphide cell.

An embodiment of the invention is shown in the accompanying drawings and is described hereinbelow.

FIG. 1 shows a top plan view of the sensing head, the upper part of the casing being removed;
FIG. 2 is a side elevation wherein some parts, which are arranged within the casing and therefore are not visible, are shown in dotted lines;
FIG. 3 is a front view of the sensing head; and
FIG. 4 is a wiring diagram.

*I. The mechanical arrangement*

Reference numeral 1 designates a motor on the shaft of which a polygonal mirror 2 consisting of several cylinder mirrors 2a is mounted. Through a lengthy rectangular opening 3 of the casing, the polygonal mirrors pick up a beam of radiation and focus this on a lead sulphide cell or some other photoconducting cell 4. The mirrors are curved in such a manner that they always direct an image of a spot in the plane W—W of the rolled stock on the lead sulphide cell. When the polygonal mirror 2 rotates in the direction of the arrow, the axis of sensitivity, or the spot image, repeatingly moves from below upwards, and thereby sweeps over a certain range perpendicularly to the direction of movement of the rolling stock. The rolled stock may be a wire 5, for instance, or a rolled strap of sheet metal. Cooling coils 4a are provided adjacent the lead sulphide cell 4 to which a stream of cooling water or cooling air can be connected by means of the sockets 6 (FIG. 3). By the sweeping movement of the spot, the rolled stock 5 or the like is traversed once during each sweep thereof and this causes one impulse to the lead sulphide cell. There is also no difference if the rolled stock shifts somewhat as long as it remains within the range swept over by the axis of sensitvity. This makes it possible to direct a relatively sharply focussed beam of rays onto the radiation detector so that sharp impulses are obtained even with wires or similar stock. These impulses are applied to a circuit which responds as soon as the radiation detector provides impulses no mater how high or long these impulses are. This circuit is shown in FIG. 4.

*II. The circuit*

The impulses from the lead sulphide cell 4 (FIG. 4) are applied to the control grid of a tube 8 acting as an impedance transducer stage through a capacitor 7. The signal from this tube is fed through a conductor 9 from the sensing head shown in FIGS. 1 to 3 to a control unit without substantial disturbance due to induction taking place. There, the impulses (see oscillogram 10) are carried to a pre-amplifier 11 comprising one system of a double triode at the plate of which impulses in accordance with oscillogram 12 are obtained. The negative peaks of the impulses 12 are cut away by a rectifier 13 and the positive impulses thus obtained (see oscillogram 14) are applied to the control grid of a grid controlled gaseous tube 15. The tube 15 together with a capacitor 16, which is charged through a resistor 17 and the charging voltage of which is stabilized by a glow-discharge tube 18, form a saw-tooth generator which is controlled by the impulses. At the plate of tube 15 a saw-tooth voltage of well defined shape and amplitude is obtained independently of the shape of the impulses 10 or 12 and 14, respectively, provided that any impulses 14 at all become effective at the grid of the tube 15 (see oscillogram 19). If no impulses 14 appear, the tube 15 remains closed by a negative grid bias tapped from the voltage divider circuit 20. The saw-tooth voltage is applied through a capacitor 21 and the second system 22 of the double triode to the control grid of an amplifier 23, which causes a pre-energized relay, or switching means, 24 to attract and to initiate the switching operation.

The pre-energization of the relay 24 is controlled through the contact 25, contact 26 switches on a signal lamp, and contact 28 is used for the control of an operation. The operating voltage for the tubes is applied in usual maner from two windings of a main transformer 29, rectified by rectifier bridges 30, 31 and smoothed by filter circuits 32, 33.

Relay 24 is pre-energized by reason of the fact that under no signal conditions the full power supply is applied to the screen grid of tube 23 through switch 25.

This results in some current flow through tube 23 and the solenoid of relay 24, but the current flow is insufficient to actuate the relay. When a saw-tooth signal is applied to the control grid of tube 23, sufficient additional current flows through the solenoid of relay 24 to actuate the relay. Switch 25 changes position. The voltage on the screen of tube 23 is then reduced by the presence of resistor 38 in the circuit. However, the current flow from the cathode to the plate of tube 23 is still sufficient to maintain relay 24 in the actuated position so long as the saw tooth signal is applied to the control grid thereof.

The invention is claimed as follows:

1. A radiation detection apparatus for rolled stock moving along a path and emitting radiant energy, said apparatus including: means for detecting said radiant energy and producing an electrical signal when radiant energy is received by said means; a scanning device proximate to the detecting means to periodically scan a line transverse to said path and of greater length than the width of said stock as measured along the line of scan and to direct any radiant energy present along the line of scan to said detecting means, whereby when said line of scan includes rolled stock emitting radiant energy said detecting means produces an electrical signal pulse with the pulses being produced periodically so long as the line of scan includes said rolled stock emitting energy; and control means connected to said detecting means, said control means including an on-off switching means having a first, normal position and a second position, said control means being adapted to actuate said switching means to move said switching means from the normal position to the second position only when a sequence of periodical pulses are received by the control means from the detecting means.

2. A radiation detection apparatus for rolled stock moving along a path and emitting radiant energy, said apparatus including: means for detecting said radiant energy and producing an electrical signal when radiant energy is received by said means, said means including a photoconducting cell; a scanning device operatively associated with the detecting means and including a rotating polygonal mirror to periodically scan a line transverse to said path and of greater length than the width of said stock, as measured along the line of scan, and to direct any radiant energy present along the line of scan to said detecting means, whereby when said line of scan includes rolled stock emitting radiant energy, said detecting means produces an electrical signal pulse with said pulses being produced periodically so long as the line of scan includes said rolled stock emitting energy; and control means including a saw-tooth generator connected to said transducer to produce a saw-tooth signal output when a sequence of periodic pulses are produced by said detecting means, and a relay connected to said generator to be energized when said saw-tooth signal output is produced by said generator.

3. A radiation detection apparatus for rolled stock moving along a path and emitting radiant energy, said apparatus including: means for detecting said radiant energy and producing an electrical signal when radiant energy is received by said means; a scanning device proximate to the detecting means to periodically scan a line transverse to said path and of greater length than the width of said stock as measured along the line of scan and to direct any radiant energy present along the line of scan to said detecting means, whereby when said line of scan includes rolled stock emitting radiant energy said detecting means produces an electrical signal pulse with the pulses being produced periodically so long as the line of scan includes said rolled stock emitting energy; and control means connected to said detecting means to respond to a sequence of periodical pulses, said control means including a saw-tooth generator triggered by said pulses to produce a pulsed, saw-tooth signal.

4. An apparatus as set forth in claim 3, wherein said control means includes a relay connected to said generator to be energized by said pulsed, saw-tooth, signal from said generator.

References Cited by the Examiner

UNITED STATES PATENTS

| | | | |
|---|---|---|---|
| 2,812,447 | 11/57 | MacMartin et al. | 250—219 X |
| 2,859,652 | 11/58 | Hopgood | 250—236 X |
| 2,964,636 | 12/60 | Cary | 250—211 |
| 3,061,731 | 10/61 | Thier et al. | 250—236 X |
| 3,097,298 | 7/63 | Astheimer et al. | 250—219 X |

RALPH G. NILSON, *Primary Examiner.*

WALTER STOLWEIN, *Examiner.*